(No Model.) 2 Sheets—Sheet 1.

J. P. ROACH.
MACHINE FOR DISTRIBUTING POISON ON WORM INFECTED PLANTS.

No. 392,289. Patented Nov. 6, 1888.

Witnesses:
J. P. Theo. Lang.
L. McK. Sumner

Inventor:
James Philip Roach
by his Attorneys
Mason, Fenwick and Lawrence (No Model.)  2 Sheets—Sheet 2.

J. P. ROACH.
MACHINE FOR DISTRIBUTING POISON ON WORM INFECTED PLANTS.

No. 392,289.  Patented Nov. 6, 1888.

Witnesses:
J. P. Theo Lang.
L. McK. Turner.

Inventor:
James Philip Roach
by his attorneys
Mason, Fenwick & Lawrence

United States Patent Office.

JAMES PHILIP ROACH, OF VICKSBURG, MISSISSIPPI.

MACHINE FOR DISTRIBUTING POISON ON WORM-INFESTED PLANTS.

SPECIFICATION forming part of Letters Patent No. 392,289, dated November 6, 1888.

Application filed August 13, 1888. Serial No. 282,514. (No model.)

*To all whom it may concern:*

Be it known that I, JAMES PHILIP ROACH, a citizen of the United States, residing at Vicksburg, in the county of Warren and State of Mississippi, have invented certain new and useful Improvements in Machines for Distributing Substances for Destroying Cotton-Worms or Potato-Bugs, &c.; and I do hereby declare the following to be a full, clear, and exact description of the invention, such as will enable others skilled in the art to which it appertains to make and use the same.

My invention consists in a wheeled machine for distributing paris-green or other poison or poisonous compounds over worm or insect infested plants, said machine comprising a novel combination of reservoir for holding the poisonous substances, an agitator, and a fan with perforated discharging-tube, the agitator and fan being driven from one of the wheels of the vehicle, and the poisonous substances being blown upon the leaves of the rows of growing plants while the machine is moved along astraddle of the respective rows.

It also consists in the combination, with the distributing mechanism, of novel means for adjusting the height and width of the machine, and in a roller for protecting the tops of the plants from injury by coming in contact with the arched axle-tree of the machine.

Figure 1:
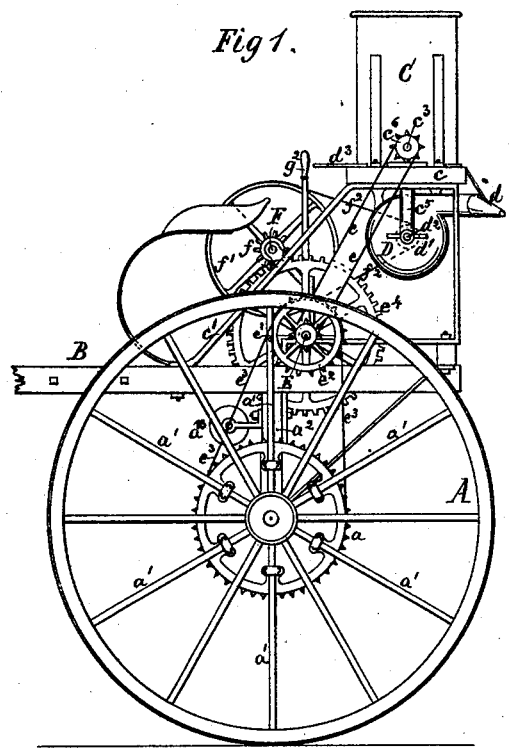
Figure 2:
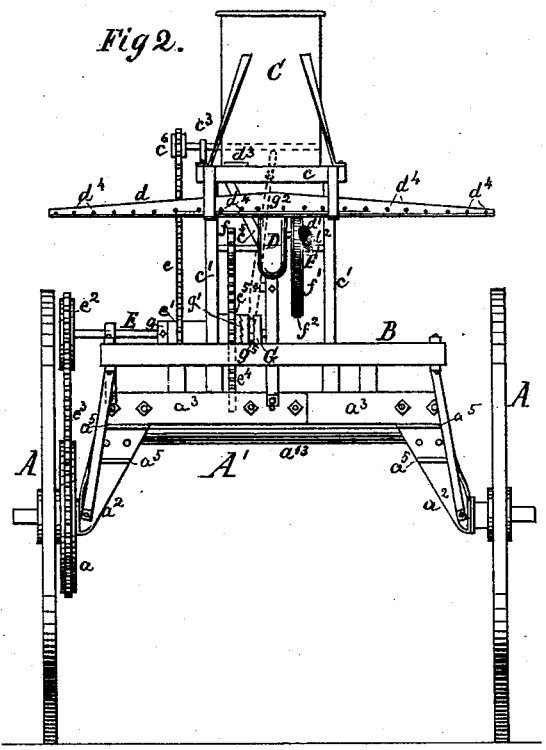
Figure 3:
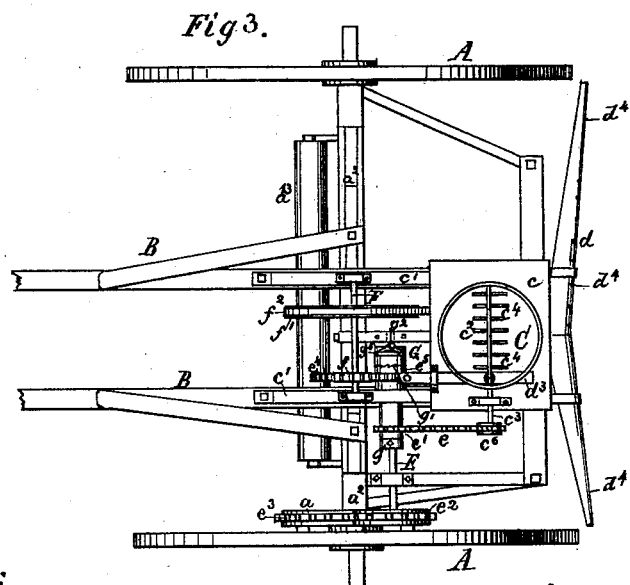
Figure 4:
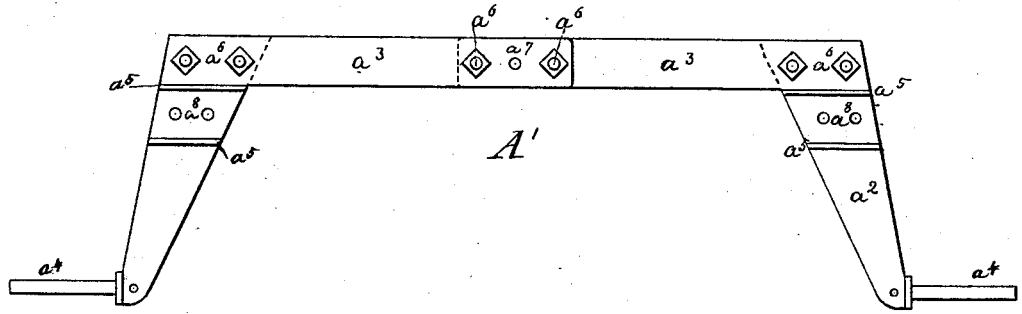
Figure 5:
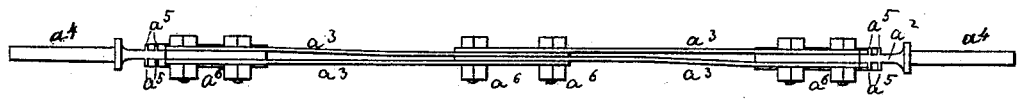
Figures 6, 7, 8:
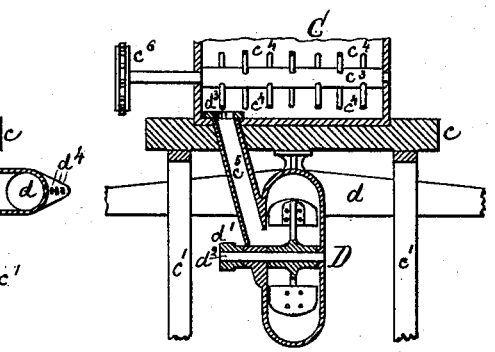

In the accompanying drawings, Figure 1 is a side elevation of my invention; Fig. 2 a rear elevation, and Fig. 3 a top view, of the same. Fig. 4 is a front elevation of the arched axle-tree; Fig. 5 a top view, and Fig. 6 an end view, of the same. Fig. 7 is a vertical longitudinal section through the fan, and Fig. 8 a vertical transverse section of the same.

The letters A A in the drawings designate two carriage-wheels; A', an arched axle-tree, and B a frame, having a reservoir, C, and distributing mechanism and gearing for operating the same applied upon it. The reservoir C is preferably a cylindrical vessel, as shown, and it rests upon a platform, $c$, mounted on two brackets or standards, $c'$ $c'$, firmly secured to the frame B.

Within the reservoir an agitator, $c^2$, is provided, whereby the substances being distributed are kept from clogging. This agitator comprises a shaft, $c^3$, with radial arms $c^4$. The reservoir is provided with a pipe, $c^5$, by means of which its contents are conducted by gravity and suction into a fan, D, an opening being provided in the side of the fan-case for this purpose. At the rear of the fan-case another opening is provided, and in this opening a branch connection of a transverse distributing-tube, $d$, is inserted. The tube $d$ is perforated in its rear with a number of orifices, $d^1$. The substances, after being conducted into the fan-case, are by centrifugal force blown through the orifices $d^1$ upon the respective rows of plants straddled by the machine.

For operating the agitator, a sprocket-wheel, $c^6$, is provided on one end of the shaft $c^3$ outside the reservoir. This wheel receives its motion from another sprocket-wheel, $e'$, on a shaft, E, by means of a chain, $e$, and the shaft E receives its motion by means of a sprocket-wheel, $e^2$, and a chain, $e^3$, from a sprocket-wheel, $a$, secured to the spokes of one of the carriage-wheels A, as shown. The shaft E is hung in an ordinary manner to the frame B, and by means of a gear-wheel, $e^4$, revolves a pinion, $f$, on a shaft, F, which is suitably hung to the brackets or standards $c'$ $c'$, and is provided with a large pulley, $f'$, which latter, by means of a belt, $f^2$, revolves a small pulley, $d'$, on the shaft $d^2$ of the fan D.

The discharge of the contents of the reservoir C into the pipe $c^5$ is regulated by a slide, $d^3$, which the driver of the machine operates by hand or foot from his seat. In order to enable the driver to stop the movements of the fan D and the agitator $c^2$, the sprocket-wheel $e'$ and gear-wheel $e^4$ are fastened or cast together and loosely fitted upon the shaft E between a rigid collar, $g$, and a sliding clutch, G. The opposite faces of the hub $e^5$ of the wheel $e^4$ and the clutch G are provided with meshing ratchet-surfaces $g'$, and the clutch G is moved longitudinally, and thereby thrown in and out of gear with the wheels $e'$ $e^4$, by means of a forked lever, $g^2$, which fits an annular groove, $g^5$, in the clutch and grasps it securely.

The axle-tree A' comprises two axle-spindle brackets, $a^2$, and four connecting-bars, $a^3$. The spindle-brackets are each provided with a spindle, $a^4$, and a number of horizontal shoulders, $a^5$, arranged in pairs on opposite sides of the brackets, as shown in Fig. 6. Upon these shoulders $a^5$ the bars $a^3$ rest, and they are fastened to both sides of the brackets (two to each bracket) by means of nutted bolts $a^6$. The two pairs of bars $a^3$ are also fastened together about midway of the space between the brackets by bolts and nuts similar to those $a^6$, and the holes $a^7$ for said latter bolts are so arranged that the bars $a^3$ can be made to overlap each other more or less, and thereby adjust or set the brackets, with all the attached portions of the machine, nearer together or farther apart, according to the distances between the rows of growing plants.

If desirable, the bars can be fastened higher or lower upon the brackets $a^2$ by placing them upon higher or lower shoulders $a^5$ of the same and inserting the bolts $a^6$ into corresponding holes, $a^8$.

A roller, $a^{12}$, is hung to the axle-tree in front of and a little below the bars $a^3$, which roller in passing over the tops of the cotton or other plants deflects them, and prevents thereby their coming in contact with the sharp corners of the axle-tree, thus keeping them from being bruised or cut.

The poisonous substances—which may be paris-green, London purple, or any other known effective agent for destroying cotton-worms, potato-bugs, and the like, as also their larvæ—are placed in a powdered dry state in the reservoir and are blown over the plants so as to settle uniformly thereon.

What I claim is—

1. A machine for distributing poisonous substances over worm or insect infested plants, consisting of a wheeled arched axle-tree, a frame, a reservoir for containing the said substances, an agitator, a discharging-fan, and a transverse perforated distributing-tube, and mechanism, as described, for operating the agitator and fan from one of the wheels of the vehicle, substantially as described.

2. In the described machine for distributing poisonous substances upon plants, wheeled axle-tree, frame, the reservoir C, having a conducting-pipe, $c^3$, and a transverse perforated distributing-tube, $d$, and mechanism for operating the fan from one of the wheels of the vehicle, substantially as and for the purpose described.

3. The described machine for distributing poisonous substances, comprising, in combination, the frame, the reservoir C, fan D, distributing-tube $d$, arched axle-tree A', gearing for operating the agitator and fan from one of the carriage-wheels of the machine, and roller $a^3$, attached to the axle-tree, substantially as and for the purpose described.

4. The combination of the reservoir C, fan D, and perforated distributing-tube $d$ with the expansible bars $a^3$, spindle-brackets $a^2$, and wheels A and frame, substantially as described.

5. The described machine for distributing poisonous substances, comprising, in combination, the frame, the reservoir C, fan D, distributing-tube $d$, gearing for operating the agitator and fan from one of the carriage-wheels of the machine, and arched axle-tree A', constructed of bars $a^3$, provided with spindle-brackets $a^2$, horizontal shoulders $a^5$, and bolt-holes $a^8$, substantially as and for the purpose described.

In testimony whereof I hereunto affix my signature in presence of two witnesses.

JAMES PHILIP ROACH.

Witnesses:
GEORGE H. RIGBY,
ROBERT C. ALLEIN.